(12) United States Patent
Diehl

(10) Patent No.: US 11,722,312 B2
(45) Date of Patent: Aug. 8, 2023

(54) PRIVACY-PRESERVING SIGNATURE

(71) Applicants: Sony Group Corporation, Tokyo (JP); Sony Pictures Entertainment Inc., Culver City, CA (US)

(72) Inventor: Eric Diehl, Culver City, CA (US)

(73) Assignees: Sony Group Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

(21) Appl. No.: 16/813,446

(22) Filed: Mar. 9, 2020

(65) Prior Publication Data

US 2021/0281422 A1    Sep. 9, 2021

(51) Int. Cl.
| | |
|---|---|
| H04L 29/06 | (2006.01) |
| H04L 9/32 | (2006.01) |
| H04L 9/08 | (2006.01) |
| H04L 9/06 | (2006.01) |

(52) U.S. Cl.
CPC .......... H04L 9/3247 (2013.01); H04L 9/0662 (2013.01); H04L 9/0825 (2013.01); H04L 9/0869 (2013.01); H04L 9/0894 (2013.01)

(58) Field of Classification Search
CPC ... H04L 9/3247; H04L 9/0825; H04L 9/0869; H04L 9/0662; H04L 9/0894
See application file for complete search history.

(56) References Cited

U.S. PATENT DOCUMENTS

| | | | | |
|---|---|---|---|---|
| 5,963,649 A | * | 10/1999 | Sako | H04L 9/3247 380/30 |
| 6,990,583 B2 | * | 1/2006 | Matsuyama | H04L 9/3268 713/168 |
| 7,681,246 B1 | * | 3/2010 | Chen | G06F 21/73 713/176 |
| 8,213,609 B2 | * | 7/2012 | Kusakawa | H04L 9/3073 713/168 |
| 8,275,994 B2 | * | 9/2012 | Funahashi | G06F 21/34 713/183 |
| 8,352,380 B2 | | 1/2013 | Canard | |
| 8,646,104 B2 | * | 2/2014 | Schneider | H04L 9/0827 380/255 |
| 10,089,801 B1 | * | 10/2018 | Musabeyoglu | G06F 21/335 |
| 10,361,865 B2 | * | 7/2019 | Hibshoosh | H04L 9/3247 |
| 2003/0021419 A1 | | 1/2003 | Hansen | |

(Continued)

FOREIGN PATENT DOCUMENTS

| | | | |
|---|---|---|---|
| CN | 104917741 A | * | 9/2015 |
| CN | 105574458 A | * | 5/2016 |

(Continued)

OTHER PUBLICATIONS

WIPO, International Preliminary Report on Patentability, in corresponding PCT/US2021/021373, dated Sep. 22, 2022, 5pgs.

*Primary Examiner* — Sher A Khan
(74) *Attorney, Agent, or Firm* — Procopio, Cory, Hargreaves & Savitch LLP

(57) ABSTRACT

Signing data so that a signature can be verified by a verifier while preserving the privacy of a signer, the method including: generating a signature nonce; encrypting the signature nonce with a public key of the verifier to produce an encrypted signature nonce; and calculating a signature of the data of the signer by signing the data concatenated with the signature nonce using a private key of the signer.

14 Claims, 5 Drawing Sheets

(56) References Cited

U.S. PATENT DOCUMENTS

| | | | |
|---|---|---|---|
| 2003/0026433 A1* | 2/2003 | Matt | H04L 9/0866 380/278 |
| 2003/0074562 A1* | 4/2003 | Hansen | H04L 9/3247 713/176 |
| 2003/0190046 A1* | 10/2003 | Kamerman | H04L 9/3265 380/286 |
| 2005/0193192 A1* | 9/2005 | Sakazaki | H04L 9/3247 713/156 |
| 2006/0106836 A1* | 5/2006 | Masugi | H04L 63/104 |
| 2006/0117182 A1* | 6/2006 | Wolff | H04L 9/3247 713/176 |
| 2007/0220259 A1* | 9/2007 | Pavlicic | G06Q 20/389 713/176 |
| 2008/0046310 A1* | 2/2008 | Canard | H04L 9/3255 705/12 |
| 2008/0187137 A1* | 8/2008 | Nikander | H04L 63/0414 380/270 |
| 2010/0037056 A1* | 2/2010 | Follis | G06F 11/1464 713/168 |
| 2010/0082986 A1* | 4/2010 | Gentry | H04L 9/3265 713/170 |
| 2011/0286595 A1* | 11/2011 | Resch | H04L 9/0869 380/46 |
| 2011/0320811 A1* | 12/2011 | Ueda | G11B 20/00173 713/158 |
| 2011/0320812 A1* | 12/2011 | Kuno | H04L 9/0866 713/168 |
| 2012/0008775 A1* | 1/2012 | Natarajan | H04W 12/06 380/247 |
| 2012/0233670 A1* | 9/2012 | Bonnes | H04L 63/105 726/4 |
| 2013/0117572 A1* | 5/2013 | Berczes | H04W 12/10 713/178 |
| 2013/0138964 A1* | 5/2013 | Joyce, III | G06Q 20/40145 713/176 |
| 2013/0205376 A1* | 8/2013 | Narasimha | H04L 9/3247 726/6 |
| 2014/0351589 A1* | 11/2014 | Chenna | H04W 12/068 713/168 |
| 2015/0319151 A1* | 11/2015 | Chastain | H04L 9/083 713/171 |
| 2016/0127366 A1 | 5/2016 | Yagisawa | |
| 2017/0301052 A1* | 10/2017 | Abt, Jr. | H04L 9/3066 |
| 2018/0026798 A1* | 1/2018 | Susella | H04L 9/3066 713/180 |
| 2018/0204191 A1* | 7/2018 | Wilson | H04L 9/3242 |
| 2018/0205559 A1* | 7/2018 | Bu Er | G06F 21/6263 |
| 2019/0013950 A1* | 1/2019 | Becker | H04L 9/3247 |
| 2019/0362083 A1* | 11/2019 | Ortiz | G06N 20/00 |
| 2019/0372763 A1* | 12/2019 | Yang | H04L 9/0847 |
| 2019/0372776 A1 | 12/2019 | Kroneisen | |
| 2020/0084023 A1* | 3/2020 | Bessonov | H04L 9/30 |
| 2020/0106774 A1* | 4/2020 | Lerch | H04W 12/069 |
| 2021/0092604 A1* | 3/2021 | Fox | H04L 9/3268 |
| 2021/0385085 A1* | 12/2021 | Wang | H04L 9/3213 |

FOREIGN PATENT DOCUMENTS

| | | | |
|---|---|---|---|
| CN | 106549769 A * | 3/2017 | |
| WO | WO-2017156590 A1 * | 9/2017 | G06F 21/31 |
| WO | WO-2018156067 A1 * | 8/2018 | G06F 21/32 |
| WO | WO-2020189927 A1 * | 9/2020 | G06Q 20/382 |

* cited by examiner

PRIVACY-PRESERVING SIGNATURE

BACKGROUND

Field

The present disclosure relates to digital signatures and more specifically, to a privacy-preserving signature scheme.

Background

The conventional means for authenticating the identity of the principal that issued a piece of digital information includes signing the digital document using an asymmetric cryptosystem such as Ron Rivest, Adi Shamir and Leonard Adleman (RSA) or Elliptic Curve Digital Signature Algorithm (EC-DSA).

In one example, the issuer, Alice, has a public-private key pair ($K_{Alice_{pub}}$ and $K_{Alice_{pri}}$). Alice signs the digital document containing the piece of digital information (data) with her private key ($K_{Alice_{pri}}$), expressed as $$S_{data} = Sign_{\{K_{Alice_{pri}}\}}(data).$$

Alice publishes her public key. The verifier, Bob, uses Alice's public key to verify both the origin of data and its integrity. The verification test passes if $$Ver_{\{K_{Alice_{pri}}\}}(S_{data}, data) = true.$$

FIG. 1 is a block diagram showing a digital signature process 100 which works to prove that the digital document 110 was not modified from the time it was signed. The signature process 100 includes inputting a digital document 110 and generating a digitally signed document 140. The signature process 100 initially generates a unique hash using a cryptographic hash function 120 of the document and signs 130 the hash using the signer's private key. The result is the signature 140. The generated hash is unique to the document 110, and changing any part of the document 110 will completely change the hash. A digitally signed document 150 is then produced by concatenating the digital document 110 with the signature 140.

FIG. 2 is a block diagram showing a verification process 200 with the digitally signed document 150 as an input. The verifier generates a new hash 212 using the hash function 210 (same as the hash function 120) from the data of the digital document part of the digitally signed document 150. Using the signer's public key, the verifier checks whether the signature 140 extracted 210 from the digitally signed document 150 matches the signature of 212.

However, in some cases, the above-described scheme may raise some privacy issues, since the threat model assumes that the issuer's public key is accessible to anybody. Alice may want to store her signed document amongst other people's documents. However, she does not want an attacker to segregate her document from the documents of other issuers. With the traditional scheme, an attacker who has Alice's public key can easily identify documents issued by Alice by verifying the signature since only Alice's documents will succeed the verification test.

SUMMARY

The present disclosure provides for a privacy-preserving signature scheme.

In one implementation, a method for signing data so that a signature can be verified by a verifier while preserving the privacy of a signer is disclosed. The method includes: generating a signature nonce; encrypting the signature nonce with a public key of the verifier to produce an encrypted signature nonce; and calculating a signature of the data of the signer by signing the data concatenated with the signature nonce using a private key of the signer.

In one implementation, generating the signature nonce includes generating a random number for the signature nonce. In one implementation, the method further includes distributing the data, the encrypted signature nonce, and the signature of the data of the signer. In one implementation, the method further includes obtaining the public key of the verifier. In one implementation, the verifier is a universal verifier who can verify signatures from all signers. In one implementation, the method further includes enabling to decrypt the encrypted signature nonce with a private key of the universal verifier. In one implementation, the method further includes enabling to verify the data concatenated with the decrypted signature nonce using a public key of the signer. In one implementation, enabling to verify includes enabling to determine whether the data concatenated with the decrypted signature nonce matches the signature of the data of the signer. In one implementation, generating the signature nonce includes processing the data with a secret function to generate the signature nonce as a pseudo-random number. In one implementation, the method further includes: transmitting the secret function to an agreed verifier; and enabling to calculate the signature nonce using the secret function. In one implementation, the method further includes enabling to verify the data concatenated with the calculated signature nonce using a public key of the signer. In one implementation, enabling to verify includes enabling to determine whether the data concatenated with the calculated signature nonce matches the signature of the data of the signer.

In another implementation, a method for a verifier to verify data signed with a signature of a signer is disclosed. The method includes: receiving the data, an encrypted signature nonce, and the signature of the data of the signer, wherein the signature nonce is encrypted with a public key of the verifier to produce the encrypted signature nonce, and wherein the signature of the data of the signer is calculated by signing the data concatenated with the signature nonce using a private key of the signer; decrypting the encrypted signature nonce with a private key of the verifier; and verifying the signature of the data of the signer concatenated with the decrypted signature nonce using a public key of the signer.

In one implementation, the data is processed with a secret function known only to the signer to generate the signature nonce.

In another implementation, a non-transitory computer-readable storage medium storing a computer program to sign data so that a signature can be verified by a verifier while preserving a privacy of a signer is disclosed. The computer program includes executable instructions that cause a computer to: generate a signature nonce; encrypt the signature nonce with a public key of the verifier to produce an encrypted signature nonce; and calculate a signature of the data of the signer by signing the data concatenated with the signature nonce using a private key of the signer.

In one implementation, the non-transitory computer-readable storage medium further includes executable instructions that cause the computer to enable to: decrypt the encrypted signature nonce with a private key of the verifier; and determine whether the data concatenated with the decrypted signature nonce matches the signature of the data of the signer. In one implementation, the executable instructions that cause the computer to generate the signature nonce includes executable instructions that cause the computer to process the data with a secret function to generate the signature nonce as a pseudo-random number. In one implementation, the non-transitory computer-readable storage medium further includes executable instructions that cause the computer to enable to verify the data concatenated with the calculated signature nonce using a public key of the signer. In one implementation, the verifier is a universal verifier who can verify signatures from all signers, and the non-transitory computer-readable storage medium further includes executable instructions that cause the computer to enable to decrypt the encrypted signature nonce with a private key of the universal verifier.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
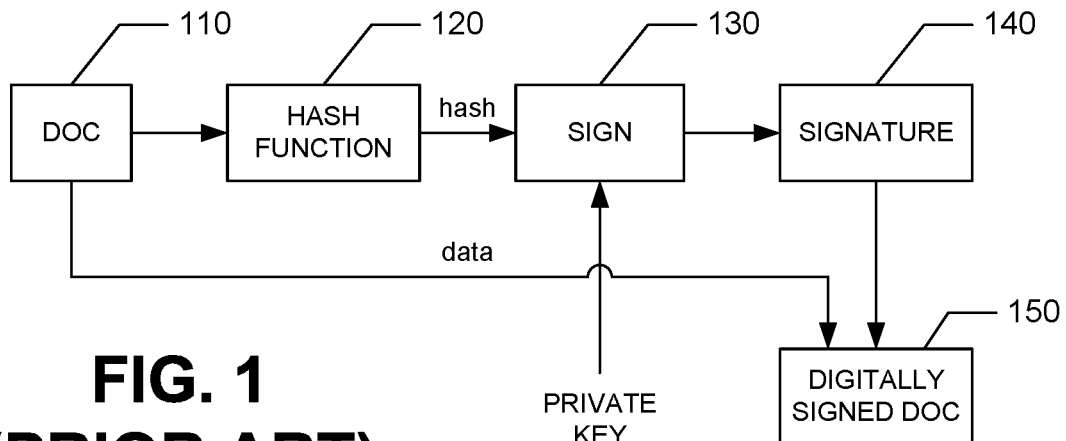
FIG. 1 is a block diagram showing a digital signature process which works to prove that the digital document was not modified from the time it was signed.
Figure 2:
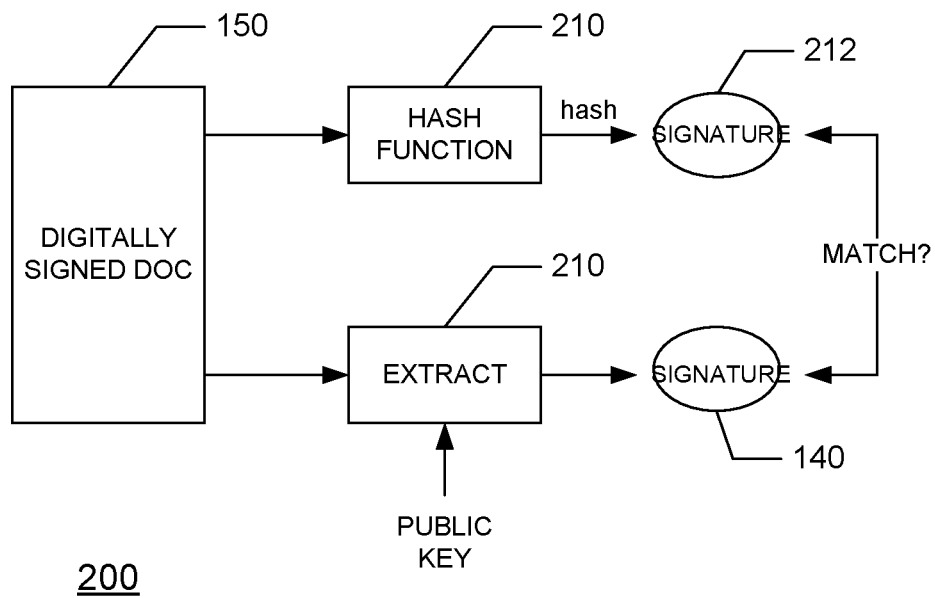
FIG. 2 is a block diagram showing a verification process with the digitally signed document as an input.

As described above, the conventional scheme of verifying the origin of data and its integrity using the public-private key pair of the issuer may raise some privacy issues. To address the above-described issues, a designated verifier signature scheme has been proposed. For one example of the designated verifier signature scheme, assume that Alice desires only Victor to verify her signed documents. Victor has a public-private key pair ($K_{Victor_{pub}}$ and $K_{Victor_{pri}}$) Alice signs the digital document containing the piece of digital information (data) with her private key ($K_{Alice_{pri}}$), expressed as $$S_{data} = Sign_{\{K_{Alice_{pri}}\}}(data).$$

Alice then encrypts the signature with Victor's public key, expressed as $$S_{data} = E_{\{K_{Victor_{pub}}\}}\left(Sign_{\{K_{Alice_{pri}}\}}(data)\right).$$

To verify the signature, Victor decrypts the signature with his private key and uses the Alice's public key to verify the data, $$Ver_{\{K_{Alice_{pub}}\}}\left(D_{\{K_{Victor_{pri}}\}}(S_{data}), data\right) = true.$$

This scheme allows Alice to decide who can verify (e.g., Victor), but this scheme requires Alice to generate separate additional signed document for each person that Alice wants to have her document verified. Thus, a new scheme is needed in which the expected features are: (1) a system that accepts only truly signed document; and (2) an issuer can decide who can verify whether the issuer issued the document using the same signed document. In this scheme, the verifier would be designated as a universal verifier.

Certain implementations of the present disclosure provide a privacy-preserving signature scheme in which the signer signs the document data with the following constraints: (1) a universal verifier may verify the signatures from all issuers/signers participating in the system; and (2) a signer provides the means for an agreed verifier to verify the signature of the data from the signer.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, the signer has a signer public key ($K_{signer_{pub}}$), a signer private key ($K_{signer_{pri}}$), and a secret function (f) that is only known to the signer. In a first implementation (when a universal verifier is exclusively to be used), the secret function generates a pseudo-random value. The universal verifier has a verifier public key ($K_{uver_{pub}}$) and a verifier private key ($K_{uver_{pri}}$). In a second implementation (when at least one agreed verifier is to be used in conjunction with a universal verifier), the secret function generates a pseudo-random value based on data contained in the document to be signed.

In the first implementation, the signer generates a signature nonce as a random number. The signer also generates the encrypted signature nonce by encrypting the signature nonce (signonce) with the universal verifier's public key, expressed as $$esignonce = E_{\{K_{uver_{pub}}\}}(signonce).$$

The signer calculates the signature (signa) by signing the data concatenated with the signature nonce using the signer's private key, expressed as $$signa = sign_{\{K_{signer_{pri}}\}}(data\|signonce).$$

The signer then distributes the data (data), the encrypted signature nonce (esignonce), and the signature (signa).

To verify the signature, the universal verifier performs the following operations: (1) The universal verifier decrypts the encrypted signature nonce (esignonce) with its verifier private key ($K_{uver_{pri}}$) to obtain the decrypted signature nonce, expressed as $$signonce' = D_{\{K_{uver_{pri}}\}}(esignonce);$$

and (2) The universal verifier verifies (using the signer's public key ($K_{signer_{pub}}$)) that the signature of the data (data) concatenated with the decrypted signature nonce (signoncé) matches the signature (signa), expressed as $$Ver_{\{K_{signer_{pub}}\}}(signa, data\|signonce') = true.$$

Thus, the universal verifier can check the signature of every principal whose public key is available. However, an attacker cannot verify the signature with the signer's public key because the attacker does not know the decrypted signature nonce (signoncé), but knows only the encrypted value (esignonce). In this scheme, only the universal verifier can decrypt the encrypted nonce. In one example of a universal verifier, when a document is sent to the blockchain to register the authorship of the document, the blockchain becomes a universal verifier to verify (using the private key of the universal verifier) the document encrypted using the public key of the universal verifier.

In the second implementation, the signer generates signature nonce as a pseudo-random number by processing the data to be signed with a secret function f expressed as signonce=f (data). The signer provides the secret function (f) to an agreed verifier in a secure manner. To check the signature, the agreed verifier performs the following operations: (1) The agreed verifier calculates signature nonce (signonce) using the provided secret function (f), expressed as signonce=f(data); and (2) The agreed verifier verifies (using the signer's public key ($K_{signer_{pub}}$) that the signature of the data data) concatenated with the calculated signature nonce (signonce) matches the signature (signa), expressed as $$Ver_{\{K_{signer_{pub}}\}}(signa, data\|signonce) = true.$$

In the above implementation, the universal verifier can check the signature as in the first implementation without knowing the secret function f.

In the above implementation of the agreed verifier, the agreed verifier can check the signature of every document (data) issued by the signer. However, an attacker cannot verify the signature with the signer public key ($K_{signer_{pub}}$) because the attacker does not know the signature nonce (signonce) and does not know secret function f, but knows only the encrypted nonce (esignonce). In one example of an agreed verifier, when an independent photographer sends a document (e.g., a photograph) to a news outlet (e.g., Reuters), the news outlet becomes an agreed verifier to verify (using the secret function sent to it by the photographer) the authenticity of the document.

Figure 3:
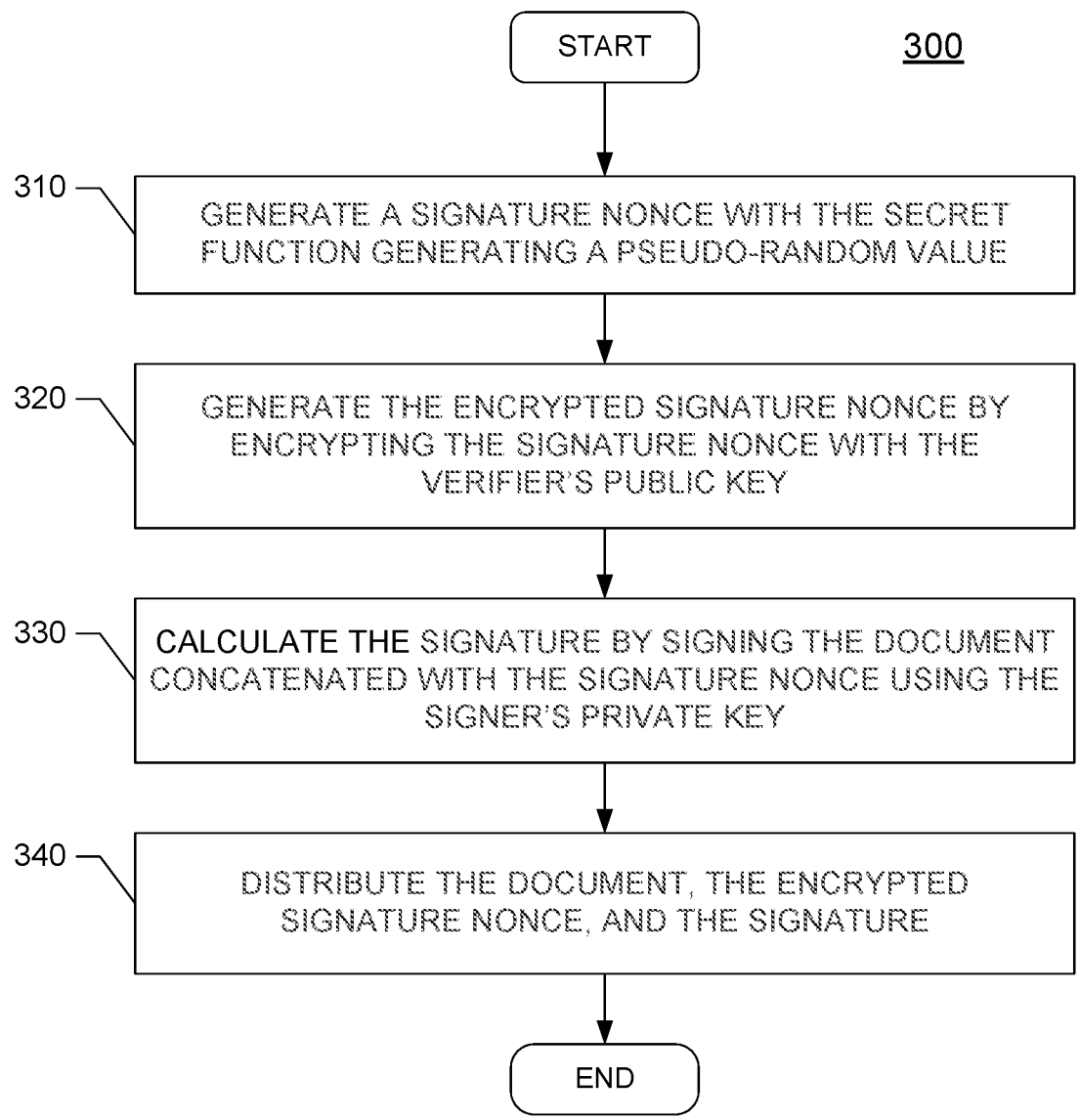
FIG. 3 is a flow diagram of a method for signing a document so that the signatures from all signers can be verified while preserving the privacy of the signers in accordance with one implementation of the present disclosure.

FIG. 3 is a flow diagram of a method 300 for signing a document (i.e., data) so that the signatures from all signers can be verified while preserving the privacy of the signers in accordance with one implementation of the present disclosure. In the illustrated implementation of FIG. 3, a signature nonce (signonce) is generated, at step 310, with a secret function generating a pseudo random value (i.e., signonce=f (data)). The encrypted signature nonce is generated, at step 320, by encrypting the signature nonce (signonce) with the verifier's public key (i.e., $$esignonce = E_{\{K_{uver_{pub}}\}}(signonce)),$$

which is readily available and is obtained by the signer prior to the encryption process. The signature signa) is then calculated, at step 330, by signing the data concatenated with the signature nonce using the signer's private key (i.e., $$signa = sign_{\{K_{signer_{pri}}\}}(data\|signonce)).$$

The data (data), the encrypted signature nonce (esignonce), and the signature (signa) are then distributed, at step 340.

Figure 4:
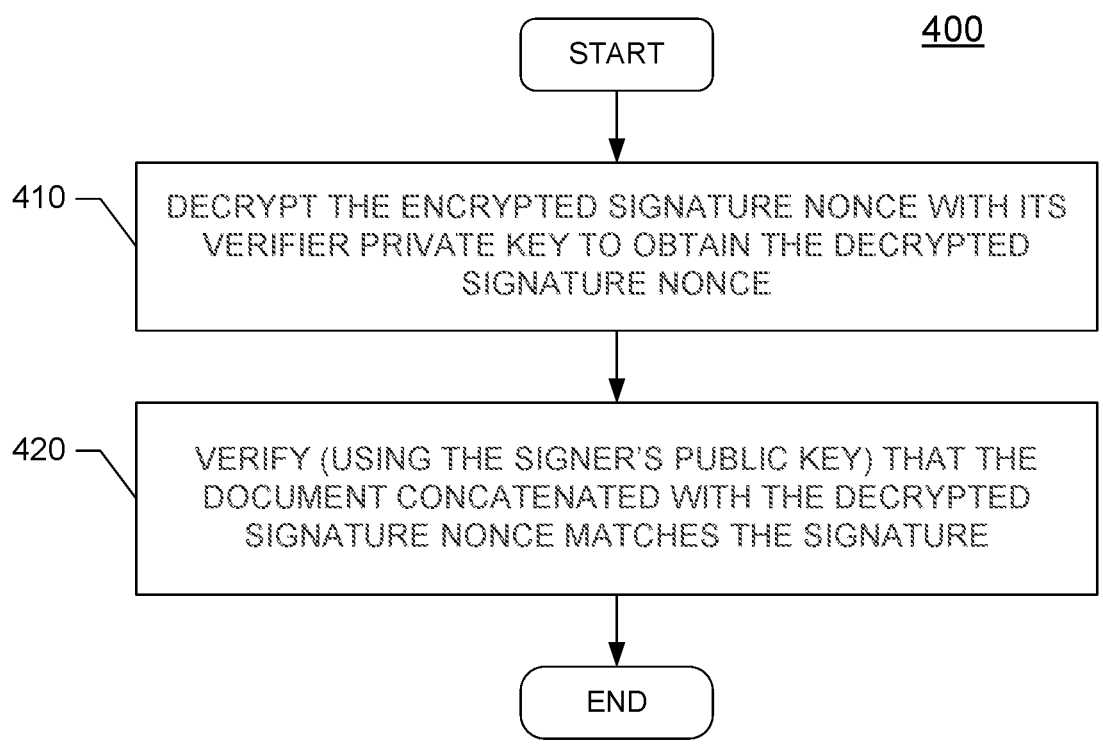
FIG. 4 is a flow diagram of a method for verifying the signatures from all signers participating in a system by a universal verifier in accordance with one implementation of the present disclosure.

FIG. 4 is a flow diagram of a method 400 for verifying the signatures from all signers participating in a system by a universal verifier in accordance with one implementation of the present disclosure. The method 400 includes verifying the signature of the document (data) generated by the method 300. In the illustrated implementation of FIG. 4, the encrypted signature nonce (esignonce) is decrypted by the universal verifier, at step 410, with its verifier private key ($K_{uver_{pri}}$) to obtain the decrypted signature nonce (i.e., $$nonce' = D_{\{K_{uver_{pri}}\}}(esignonce)).$$

The data (data) concatenated with the decrypted signature nonce (signoncé) is then verified by the universal verifier (using the signer's public key ($K_{signer_{pub}}$), at step 420, to determine whether it (data∥signoncé); matches the signature (signa) (i.e., $$Ver_{\{K_{signer_{pub}}\}}\left(signa, data\|signonce'\right) = true\right).$$

Figure 5:
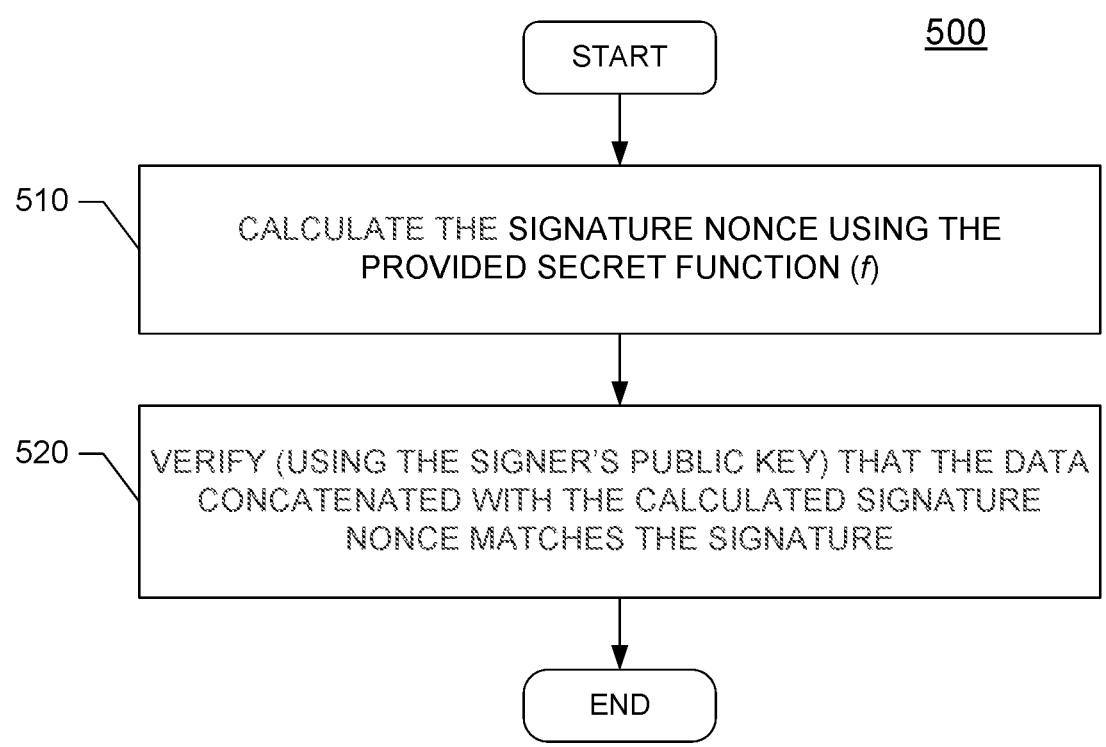
FIG. 5 is a flow diagram of a method for verifying the signature of the data by an agreed verifier in accordance with one implementation of the present disclosure.

FIG. 5 is a flow diagram of a method 500 for verifying the signature of the document (data) by an agreed verifier in accordance with one implementation of the present disclosure. In this implementation, the signer provides the secret function (f) securely out of band (i.e., through a different channel than the distribution channel of the other parameters (data, esignonce, and signa)) to the agreed verifier only once. In practice, the signer provides a secret key to a known function to the agreed verifier. The signer then distributes the other parameters to everybody as in step 340.

In the illustrated implementation of FIG. 5, the signature nonce (signonce) is calculated by the agreed verifier, at step 510, using the provided secret function (f) (i.e., signonce=f (data)). The data (data, concatenated with the calculated signature nonce (signonce is then verified by the agreed verifier (using the signer's public key ($K_{signer_{pub}}$), at step 520, to determine whether it (data||signonce) matches the signature (signa (i.e., $$Ver_{\{K_{signer_{pub}}\}}(signa, data \| signonce) = \text{true}).$$

In the illustrated implementation of FIG. 5, the agreed verifier can check the signature of every document issued by the signer. However, an attacker cannot verify the signature with the signer public key ($K_{signer_{pub}}$) because the attacker does not know the signature nonce (signonce), but knows only the encrypted nonce (esignonce).

In one example implementation, in which an RSA-2048 cryptosystem is used, a signer generates a signer private key and a signer public key. A Certification Authority then generates a signed X509 signature certificate for the signer public key. The signer publishes this certificate. Thus, the use of a signed certificate, rather than a raw public key, is best practice in security. Further, a universal verifier generates a verifier private key and verifier public key. The Certification Authority generates a signed X509 encryption certificate for the verifier public key. The universal verifier then publishes this certificate. The Certification Authority publishes its public root key.

In one implementation, the signer generates the signer's secret key ($KS_{signer}$) that is a 256-bit random number. The signature process is as follows: (1) the signer calculates the hash (h) of data using SHA256 (h=SHA2S6(data)); (2) the signer also generates the signature nonce (signonce) by processing the hash with the signer's secret key using HMAC-SHA256 (i.e., the secret key ($KS_{signer}$) plus function HMAC-SHA256 constitutes the secret function but the signer needs only to securely distribute $KS_{signer}$); (3) the signer generates the encrypted signature nonce (esignonce) by encrypting the signature nonce with the verifier's public key ($K_{uver_{pub}}$); (4) the signer then calculates the signature (signa) by signing with the signer's private key ($KS_{signer_{pri}}$) the concatenated hash (h) and the signature nonce (signonce), expressed as $$signa = Sign_{\{K_{signer_{pri}}\}}(h \| signonce);$$

and (5) the signer distributes data (data), the encrypted signature nonce (esignonce), and the signature (signa).

To verify the signature in one implementation, the universal verifier verifies that the certification of the signer is still valid. If it is not still valid, the universal verifier may proceed but informs the signer that the certificate has expired or revoked. The response of the system may differ depending on the decision of the system. For example, the system may only validate the signature of documents that occur before the expiration or revocation date. In that case, a time stamp of the signature date may be added to the signed document. The universal verifier decrypts the encrypted signature nonce (esignonce) with the verifier's private key ($K_{uver_{pri}}$) to obtain the decrypted signature nonce (signoncé)

$$signonce' = D_{\{K_{uver_{pri}}\}}(esignonce).$$

The universal verifier then calculates the hash (h) of the data using SHA256. The universal verifier then verifies that the signature of hash (h) and decrypted signature nonce (signonce) using the signer's public key ($K_{signer_{pub}}$) matches the signature (signa), $$Ver_{\{K_{signer_{pub}}\}}(signa, h \| signonce') = \text{true}.$$

In another implementation, the signer provides securely (but "out-of-band") the signer's secret key ($KS_{signer}$) to the agreed verifier. To verify the signature, the agreed verifier: (1) calculates signature nonce (signonce) using the provided signer's secret key ($KS_{signer}$), expressed as $$signonce' = HMAC_{\{KS_{signer}\}}(SHA256 \text{ (data)});$$

and (2) verifies that the signature of the concatenated hash and calculated signature nonce matches signature (signonce) (i.e.

$$Ver_{\{K_{signer_{pub}}\}}(signa, SHA256(\text{data}) \| signonce) = \text{true}).$$

Figure 6A:
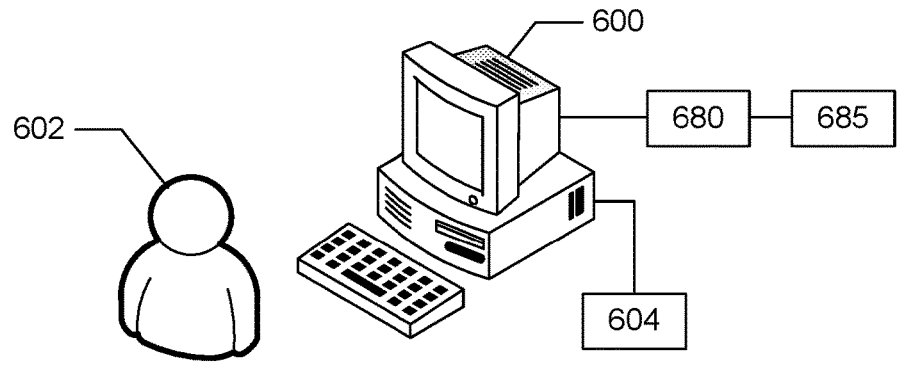
FIG. 6A is a representation of a computer system and a user in accordance with an implementation of the present disclosure.

FIG. 6A is a representation of a computer system 600 and a user 602 in accordance with an implementation of the present disclosure. The user 602 uses the computer system 600 to implement a document verification application 690 as illustrated and described with respect to the methods 300, 400, 500 in FIGS. 3 through 5.

Figure 6B:
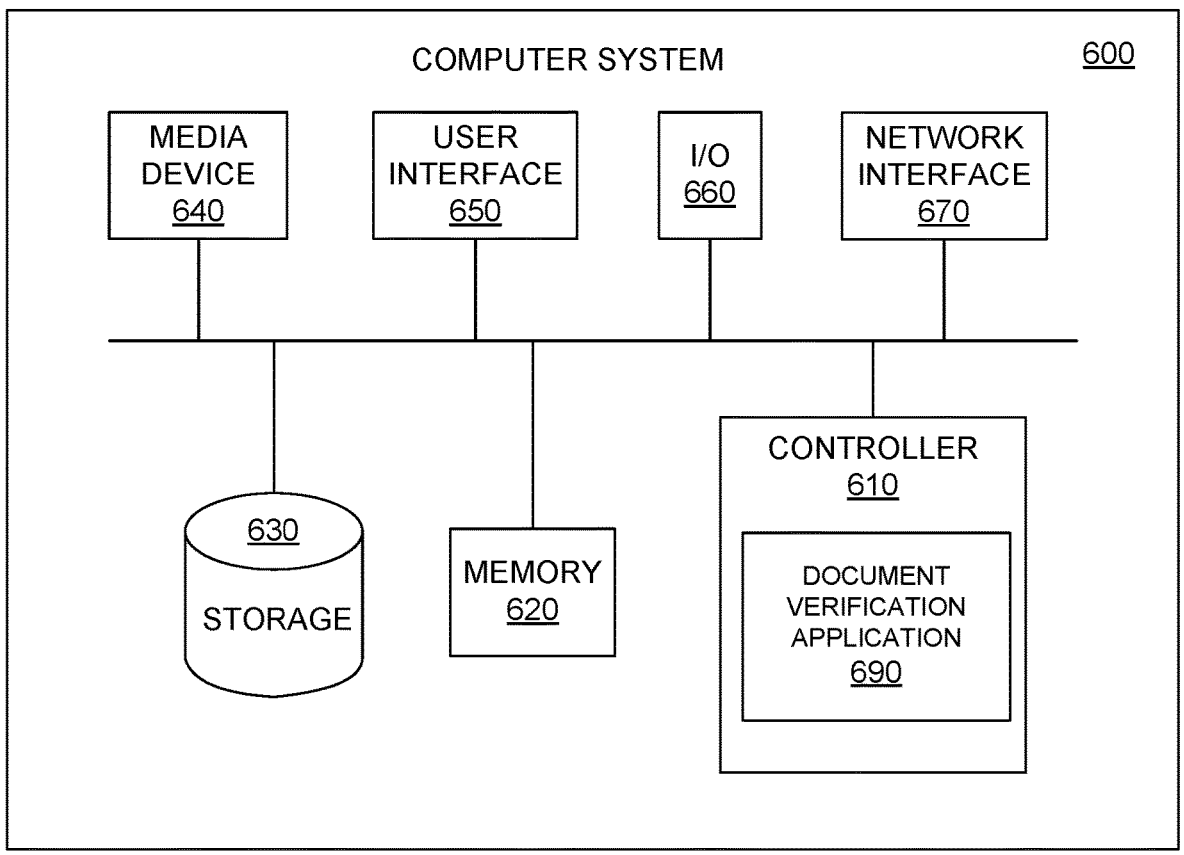
FIG. 6B is a functional block diagram illustrating the computer system hosting the document verification application in accordance with an implementation of the present disclosure.

The computer system 600 stores and executes the document verification application 690 of FIG. 6B. In addition, the computer system 600 may be in communication with a software program 604. Software program 604 may include the software code for the document verification application 690. Software program 604 may be loaded on an external medium such as a CD, DVD, or a storage drive, as will be explained further below.

Furthermore, computer system 600 may be connected to a network 680. The network 680 can be connected in various different architectures, for example, client-server architecture, a Peer-to-Peer network architecture, or other type of architectures. For example, network 680 can be in communication with a server 685 (e.g., a group of servers located at data sources) that coordinates engines and data used within the document verification application 690. Also the network can be different types of networks. For example the network 680 can be the Internet, a Local Area Network or any variations of Local Area Network, a Wide Area Network, a Metropolitan Area Network, an Intranet or Extranet, or a wireless network.

FIG. 6B is a functional block diagram illustrating the computer system 600 hosting the document verification application 690 in accordance with an implementation of the present disclosure. A controller 610 is a programmable processor and controls the operation of the computer system 600 and its components. The controller 610 loads instructions (e.g., in the form of a computer program) from the memory 620 or an embedded controller memory (not shown) and executes these instructions to control the system. In its execution, the controller 610 provides the document verification application 690 with a software system, such as to enable the creation and configuration of engines and interfaces within the document verification application 690. Alternatively, this application can be implemented as separate hardware components in the controller 610 or the computer system 600.

Memory 620 stores data temporarily for use by the other components of the computer system 600. In one implementation, memory 620 is implemented as RAM. In one implementation, memory 620 also includes long-term or permanent memory, such as flash memory and/or ROM.

Storage 630 stores data either temporarily or for long periods of time for use by the other components of the computer system 600. For example, storage 630 stores data used by the document verification application 690. In one implementation, storage 630 is a hard disk drive.

The media device 640 receives removable media and reads and/or writes data to the inserted media. In one implementation, for example, the media device 640 is an optical disc drive.

The user interface 650 includes components for accepting user input from the user of the computer system 600 and presenting information to the user 602. In one implementation, the user interface 650 includes a keyboard, a mouse, audio speakers, and a display. The controller 610 uses input from the user 602 to adjust the operation of the computer system 600.

The I/O interface 660 includes one or more I/O ports to connect to corresponding I/O devices, such as external storage or supplemental devices (e.g., a printer or a PDA). In one implementation, the ports of the I/O interface 660 include ports such as: USB ports, PCMCIA ports, serial ports, and/or parallel ports. In another implementation, the I/O interface 660 includes a wireless interface for communication with external devices wirelessly.

The network interface 670 includes a wired and/or wireless network connection, such as an RJ-45 or "Wi-Fi" interface (including, but not limited to 802.11) supporting an Ethernet connection.

The computer system 600 includes additional hardware and software typical of computer systems (e.g., power, cooling, operating system), though these components are not specifically shown in FIG. 6B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for signing data so that a signature can be verified by a verifier while preserving the privacy of a signer, the method comprising:
   generating a signature nonce by processing the data with a secret function,
   wherein the secret function is a function known only to the signer and is used to generate a pseudo-random value of the signature nonce based on data to be signed;
   encrypting the signature nonce by the signer with a public key of the verifier to produce an encrypted signature nonce so that the encrypted signature nonce can be decrypted with a private key of the verifier instead of a private key of the signer;
   calculating a signature of the data of the signer by signing the data concatenated with the signature nonce using the private key of the signer; and
   distributing the data, the encrypted signature nonce, and the signature of the data of the signer.

2. The method of claim 1, wherein generating the signature nonce comprises generating a random number for the signature nonce.

3. The method of claim 1, further comprising obtaining the public key of the verifier.

4. The method of claim 1, wherein the verifier is a universal verifier who can verify signatures from all signers.

5. The method of claim 4, wherein once the encrypted signature nonce is received by the universal verifier, the encrypted signature nonce is decrypted with a private key of the universal verifier.

6. The method of claim 5, wherein once the encrypted signature nonce is received by the universal verifier, the data concatenated with the decrypted signature nonce is verified using a public key of the signer.

7. The method of claim 6, wherein the verifier verifies the data concatenated with the decrypted signature nonce by determining whether it matches the signature of the data of the signer.

8. The method of claim 1, further comprising:
   transmitting the secret function to the verifier,
   wherein once the secret function is received by the verifier, the signature nonce is calculated by the verifier using the secret function.

9. The method of claim 8, wherein once the signature nonce is calculated, the data concatenated with the calculated signature nonce is verified by the verifier using a public key of the signer.

10. The method of claim 9, wherein verifying the data concatenated with the calculated signature nonce comprises determining whether the data concatenated with the calculated signature nonce matches the signature of the data of the signer.

11. A method for a verifier to verify data signed with a signature of the data of a signer, the method comprising:
   receiving the data, an encrypted signature nonce, and the signature of the data of the signer,
   wherein the encrypted signature nonce is produced by encrypting a signature nonce with a public key of the verifier,
   wherein the received data is processed with a secret function, wherein the secret function is a function known only to the signer and is used to generate a pseudo-random value of the signature nonce based on data to be signed, and wherein the signature of the data of signer is calculated by signing the data concatenated with the signature nonce using a private key of the signer;

decrypting the encrypted signature nonce with a private key of the verifier since the signature nonce was encrypted with the private key of the verifier instead of the private key of the signer; and verifying the signature of the data of the signer concatenated with the decrypted signature nonce using a public key of the signer.

12. A non-transitory computer-readable storage medium storing a computer program to sign data so that a signature of the data of a signer can be verified by a verifier while preserving a privacy of the signer, the computer program comprising executable instructions that cause a computer to:

generate a signature nonce by processing the data with a secret function, wherein the secret function is a function known only to the signer and is used to generate a pseudo-random value of the signature nonce based on data to be signed;

encrypt the signature nonce by the signer with a public key of the verifier to produce an encrypted signature nonce so that the encrypted signature nonce can be decrypted with a private key of the verifier instead of a private key of the signer;

calculate a signature of the data of the signer by signing the data concatenated with the signature nonce using the private key of the signer; and distribute the data, the encrypted signature nonce, and the signature of the data of the signer.

13. The non-transitory computer-readable storage medium of claim 12, wherein once the encrypted signature nonce is received by the universal verifier, the encrypted signature nonce is decrypted with a private key of the verifier, and the data concatenated with the decrypted signature nonce is verified by determining whether it matches the signature of the data of the signer.

14. The non-transitory computer-readable storage medium of claim 12, wherein once the signature nonce is calculated, the data concatenated with the calculated signature nonce is verified by the verifier using a public key of the signer.

* * * * *